United States Patent Office 2,702,795  
Patented Feb. 22, 1955

2,702,795

ANION EXCHANGE RESIN RESTORATION PROCESS

Martin E. Gilwood, Oceanside, N. Y., assignor to The Permutit Company, New York, N. Y., a corporation of Delaware No Drawing. Application June 5, 1952, Serial No. 291,995

18 Claims. (Cl. 260—2.1)

The present invention relates to a novel process for the restoration of partially deteriorated, highly basic anion exchange resins. The process is useful for the restoration of partially deteriorated highly basic aromatic anion exchange resins, having as the active anion exchanging group a quaternary ammonium group having a lower alkanol substituent and more specifically to N-(lower alkanol-substituted) quaternary ammonium hydroxide-methylene aromatic anion exchange resins. The process is particularly directed to N-(dialkyl, ethanol) quaternary ammonium hydroxide-methylene aromatic anion exchange resins.

It is an object of the present invention to provide a novel process to restore partially deteriorated highly basic anion exchange resins to their full operating exchange capacities.

It is a further object of the present invention to make possible longer useful life for a type of highly basic anion exchange resin.

The anion exchange resins to be restored by the process of my invention are the highly basic resins in which the active substituent is an N-(ethanol-substituted) quaternary ammonium group and particularly those prepared by substituting the common aromatic resins used in ion exchange resins, such as the polymers of vinyl aryl compounds, including the copolymers of a mono and a divinyl benzene; copolymers of monovinyl benzene and unsaturated aliphatic crosslinkers, such as divinyl ketone, divinyl sulfone, divinyl esters of dibasic acids, vinyl esters of acrylic, methacrylic and ethacrylic acids, and acrylic diesters of an aliphatic polyhydric alcohol; hydrocarbon resins, such as may be prepared by the Friedel-Crafts Reaction of an alkyl dihalide of an aromatic hydrocarbon; and chloroalkylaromatic compounds by themselves or in admixture with an aromatic hydrocarbon, with an N-(ethanol-substituted) quaternary ammonium group as the active anion exchanging group. The above resins are substituted with the quaternary ammonium group by first introducing a halomethyl group on the aromatic ring of the resin followed by subsequent treatment with an N, N-dialkyl, N-ethanolamine to form the quaternary ammonium salt. Also included as anion exchange resins containing the N-(ethanol-substituted) quaternary ammonium group are those described in U. S. Patent 2,540,985 to Jackson wherein the quaternary ammonium nitrogen atom is part of the pyridine group of the copolymer. For use in anion exchange, the resulting quaternary ammonium halide is converted to the corresponding quaternary ammonium hydroxide and thus placed in the hydroxide exchanging condition by treatment with a strong base, such as a solution of sodium hydroxide. The basic quaternary ammonium group then has the structure:

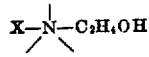

When visualized in structural form, one molecular unit of the resulting anion exchange resin having the quaternary ammonium group attached to the aromatic ring of the polymer by a methylene group has the following formula:

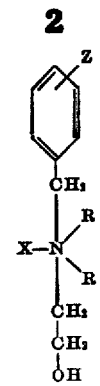

in which Z is the residue making up the remainder of the resin molecule; the R's are lower alkyl groups, such as methyl, ethyl, propyl and butyl; and X is a hydroxyl group when the anion exchange resin is placed in condition for anion exchange use.

The anion exchange resins having an ethanol substituted quaternary ammonium grouping are highly basic. Because of this high degree of basicity, these anion exchange resins are particularly satisfactory for the removal from aqueous solutions of weakly acidic anions, including silica and carbon dioxide. Waters used as feed water in high pressure boilers must be relatively free of silica. Because of their high capacity for the removal of even small concentrations of silica, these resins are highly desirable anion exchangers for use in the treatment of high-pressure boiler feed water, as well as in the more conventional ion exchange demineralizing processes.

However, the N-(ethanol-substituted) quaternary ammonium type anion exchangers suffer from a serious disadvantage. This is their tendency to deteriorate rapidly and lose their basicity. With loss in basicity, there is a diminution in the operating capacity of the anion exchange resins, and particularly in their ability to remove weak anions, such as carbon dioxide and silica from aqueous solutions. This loss in basicity under ordinary operating conditions can be serious for certain applications in that effluent water from the anion exchange resin contains higher concentrations of the weak acids than can be tolerated for the use for which the conditioned water is intended. Influent waters having a high concentration of silica tend to decrease the capacity of the anion exchange resin.

I have discovered that the capacity of these N-(ethanol-substituted) amine quaternary ammonium type anion exchangers for the removal of weak anions, such as silica, is also diminished greatly where the influent waters to be treated contain lower concentrations of free mineral acids or strong acids in the order of 50 parts per million than where the free mineral acid concentration is in the order of 200 parts per million. The N-(ethanol-substituted) quaternary ammonium type anion exchangers are particularly subject to loss in basicity when used at higher temperatures.

I have discovered a novel process for restoring partially deteriorated N-(ethanol-substituted) quaternary ammonium hydroxide type anion exchange resins, which have suffered a loss of exchange capacity (diminution in basicity), which comprises treating these resins with an ethylenehalohydrin. I contemplate only chlorine and bromine as the halogen atom in these halohydrins. I prefer to use ethylenechlorohydrin. The resin may be treated by various procedures with the ethylenehalohydrin but I prefer to treat the resin with an aqueous solution of the ethylenehalohydrin for a period of time at about 50° C. Heat is not necessary according to my process but by using temperatures in the range of 40 to 70° C., the restoration reaction is enhanced. By treating the resin at room temperature, restoration may be accomplished but longer periods of time are required than at elevated temperatures. Also, higher temperatures may be used up to the boiling point of pure ethylenehalohydrin, but no particular advantage is gained by the use of such higher temperatures. In addition to treating the resin with an aqueous solution of the ethylenechlorohydrin, satisfactory results may be obtained by using the undiluted halohydrin. I have conducted experiments using aqueous solutions with varying concentrations of the ethylenehalohydrin with satisfactory results. I prefer to use fairly concentrated solutions, as more efficient restoration may be effected.

A particular advantage of my invention is that the anion exchange resins may be restored by treating the resin in situ in the anion exchange equipment. This may be accomplished by percolating the warm ethylenehalohydrin or its aqueous solution slowly through the resin. Optimum results may be obtained by recycling the ethylenehalohydrin one or more times through the equipment containing the anion exchange resin. Precautions should be observed in removing the toxic fumes of ethylenehalohydrin.

I have found that by using the process of my invention, I may increase the basicity value of the resin by as much as 100% for badly deteriorated resin material. For example, treatment of the resin with the ethylenehalohydrin may effect an increase in basicity value of as much as 5 kilograins of basicity value per cubic foot of resin. Data obtained to date indicates that optimum restoration is obtained if the highly basic anion exchange resin is subjected to the restoration process before deterioration has proceeded to more than a small extent. If the exchange resin has deteriorated by more than about 25 to 40% of its original operating capacity, restoration is not obtained to such a high degree as when the deterioration has not exceeded this amount.

In the foregoing paragraph and elsewhere in the present specification, the "basicity value" referred to is a measure of the capacity of the anion exchange resin to remove the anions of weak acids. Since their value as highly basic anion exchangers resides primarily in their ability to remove the anions of weak acids, as well as those of strong acids, this is a critical value of the performance of any basic anion exchange resin. This value is obtained by passing 270 ml. of a 0.75 normal sodium hydroxide solution through a 16 ml. column containing 40 ml. of the basic anion exchange resin at a flow rate of approximately 5 ml. per minute. This places the anion exchange resin in the hydroxide exchanging condition. The resin bed is rinsed as free as possible of phenolphthalein alkalinity with distilled water. 750 ml. of 0.5 normal sodium chloride solution is next passed through the bed at a flow rate of 7.5 ml. per minute. The column is washed with distilled water. The effluent and washings from the sodium chloride treatment are collected, mixed and titrated with 0.02 normal sulfuric acid solution to a methyl orange endpoint. Since the strongly basic anion exchange will remove chloride ion from the sodium chloride solution and convert sodium chloride to sodium hydroxide, this determination permits the calculation of the sodium chloride converted to sodium hydroxide giving the salt splitting capacity of the anion exchange resin. This value is usually reported in terms of kilograins of calcium carbonate per cubic foot of anion exchange resin. Resins having a high "basicity" or "salt splitting" value will, of course, have a high capacity for removal of weak acids, such as silicic acid and carbonic acid from solutions.

In evaluating the efficiency of the process of the invention, resins which had undergone repeated regeneration and usage under actual conditions of service (field conditions) were subjected to the restoration process to observe the effectiveness of the process. Since it is inconvenient and unnecessarily slow to rely solely upon tests of resin which await long periods of field service or long-term exposure to effect deterioration, an accelerated deterioration test was devised. The accelerated test was used to corroborate the results obtained with resin deteriorated under long-term field tests. The accelerated test constituted boiling the exchange resin with 5% sodium hydroxide to effect deterioration. It was found that with both the long-term exposure and the accelerated exposure, there was a slight increase in the nitrogen content of the resin. This is believed to be ample evidence of the validity of the accelerated exposure test to deteriorate the anion exchange resin for evaluation of the restoration process. Evidence to date indicates that while those highly basic anion exchange resins deteriorated by the accelerated exposure test may be restored equally satisfactorily in the regenerated (hydroxyl exchanging condition) or the salt form, those resins deteriorated by the long-term exposure are not as satisfactorily restored in the salt form as in the regenerated or hydroxyl exchanging condition.

The example which follow illustrate the use of the process on a type of N-(di-lower-alkyl, ethanol) quaternary ammonium-methylene derivative of a copolymer of styrene and divinyl benzene. The polymer used in the examples is one produced from 85 to 95% styrene and 5 to 15% divinyl benzene. The process may be used upon highly basic anion exchange resins of other polymers also.

In order more clearly to disclose the nature of the present invention, specific examples illustrating the process will hereinafter be described. It should be understood, however, that this is done solely by way of example and is intended neither to delineate the scope of the invention nor limit the ambit of the appended claims. Unless otherwise stated, quantities are given in terms of parts by weight.

*Example 1*

About 200 ml. of wet, drained beads of N-(dimethyl, ethanol) quaternary ammonium-methylene derivative of a copolymer of styrene (90%) and divinyl benzene (10%) which had been subjected to many regenerations under conditions of anion exchange service and which as a result of such service had a basicity value of 9.1 kilograins per cubic foot and a nitrogen percentage of 4.0 was regenerated to the hydroxyl exchanging condition by washing with a 10% solution of sodium hydroxide. The regenerated resin was washed free of sodium hydroxide with water and drained free. The resin was then suspended in 100 ml. of water and 175 gms. of ethylenechlorohydrin was added. The mixture was heated at 50° C. for five hours and then washed with distilled water. The basicity value after treatment was 13.1 kilograins per cubic foot and the nitrogen content was 3.1%.

When restoration of the same material by the same process was attempted with the resin in the salt or chloride form, the basicity value was raised only to 9.8 kilograins per cubic foot.

*Example 2*

About 200 ml. of wet, drained beads of N-(dimethyl, ethanol) quaternary ammonium-methylene derivative of a copolymer of styrene (90%) and divinyl benzene (10%) which originally had a basicity value of 19.5 kilograins per cubic foot and which after 400 regenerations under the conditions of normal long-term usage had a basicity value of 7.7 kilograins per cubic foot was regenerated to the hydroxyl exchanging condition by washing with a 10% solution of sodium hydroxide. The regenerated resin was washed free of sodium hydroxide with water and drained free. The resin was then suspended in 100 ml. of water and 175 gms. of ethylenechlorohydrin was added. The mixture was heated at 50° C. for five hours and then washed with distilled water. The basicity value after treatment was 12.4 kilograins per cubic foot.

When restoration of the same material using the same process was attempted with the resin in the salt or chloride form, the basicity value was raised only to 8.3 kilograins per cubic foot.

*Example 3*

A highly basic anion exchange resin of N-(diethyl, ethanol) quaternary ammonium-methylene derivative of a copolymer of styrene (90%) and divinyl benzene (10%) which originally had a basicity value of 14.5 kilograins per cubic foot was heated with a 5% aqueous solution of sodium hydroxide after which the basicity value dropped to 5.1 kilograins per cubic foot. About 200 ml. of the resin was regenerated to the hydroxyl exchanging condition as in Example 1 and subjected to the same restoration procedure of Example 1. As a result of this treatment, the basicity value was restored to 13.1 kilograins per cubic foot.

*Example 4*

A highly basic anion exchange resin of N-(dimethyl, ethanol) quaternary ammonium-methylene derivative of a copolymer of styrene (90%) and divinyl benzene (10%) which originally had a basicity value of 19.0 kilograins per cubic foot was subjected to the accelerated deterioration treatment by heating in a 5% aqueous sodium hydroxide solution for twenty-four hours after which the basicity value was reduced to 8.2 kilograins per cubic foot. Upon subjecting the partially deteriorated resin to the same restoration process as described in Example 1, the basicity value was restored to 19.9 kilograin per cubic foot.

Example 5

About 75 grams of N-(dimethyl, ethanol) quaternary ammonium-methylene derivative of a copolymer of styrene (90%) and divinyl benzene (10%) which originally had a basicity value of 15.1 kilograins per cubic foot and which after considerable usage and regenerations had a basicity value of only 5.2 kilograins per cubic foot of resin, was refluxed with 80 grams of ethylenechlorohydrin at its boiling point of 128° C. for eighteen hours. The restored anion exchange resin may be recovered by filtration. After this treatment, the basicity value was 11.0 kilograins per cubic foot.

Example 6

To about 75 grams of N-(dimethyl, ethanol) quaternary ammonium-methylene derivative of a copolymer of styrene (90%) and divinyl benzene (10%) having a basicity value of only 5.2 kilograins per cubic foot was added a solution of 100 ml. of water and 80 grams of ethylenechlorohydrin. The mixture was refluxed for eighteen hours. At the end of the treatment, the restored resin had a basicity value of 12.7 kilograins per cubic foot.

Example 7

To about 75 grams of N-(dimethyl, ethanol) quaternary ammonium-methylene derivative of a copolymer of styrene (90%) and divinyl benzene (10%) having a basicity value of only 5.2 kilograins per cubic foot was added a solution of 80 grams of ethylenechlorohydrin dissolved in 100 ml. of water. The mixture was shaken at room temperature for twenty four hours. At the end of this restoration treatment, the basicity value of the resin was 12.6 kilograins per cubic foot.

Example 8

About 302 grams of N-(dimethyl, ethanol) quaternary ammonium-methylene derivative of a copolymer of styrene (90%) and divinyl benzene (10%) was heated with an aqueous solution of 110 grams of ethylenechlorohydrin in 100 ml. of water at 50° C. for five hours. The partially deteriorated resin originally had a basicity value of 12.5 kilograins per cubic foot and after the restoration treatment, had a basicity value of 17.0 kilograins per cubic foot. The restored anion exchange resin had an average silica removing capacity of 14.0 kilograins per cubic foot and was capable of producing effluent water after cation exchange containing only 0.05 to 0.1 parts per million of silica from water having an original concentration of 50 parts per million (calculated as calcium carbonate) of free mineral acids.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A process for restoring to higher basicity values highly basic anion exchange resins having as an active anion exchanging group a N-(lower alkanol-substituted) quaternary ammonium hydroxide substituent and which as a result of repeated regeneration and anion operating cycle under conditions of service have become partially deteriorated as demonstrated by the diminution in their original basicity values, said process comprising contacting said partially deteriorated anion exchange resin with a lower alkylenehalohydrin selected from the class consisting of lower alkylenechlorohydrins and lower alkylenebromohydrins.

2. A process as defined in claim 1, wherein the lower alkylenehalohydrin is employed in the form of an aqueous solution.

3. A process as defined in claim 1, wherein the lower alkylenehalohydrin is an ethylenehalohydrin.

4. A process as defined in claim 1, wherein the anion exchange resin is first regenerated to the hydroxyl exchanging condition and subsequently contacted with the lower alkylenehalohydrin.

5. A process for restoring to higher basicity values highly basic anion exchange resins selected from the group consisting of copolymer resins of a vinyl aryl compound and a polyolefinic unsaturated organic crosslinker compound and which have as the active anion exchanging group a N-(lower alkanol-substituted) quaternary ammonium hydroxide-methylene substituent attached to the aromatic nuclei of the copolymer, which anion exchange resins as a result of repeated regeneration and anion operating cycle under conditions of service have become partially deteriorated as demonstrated by a diminution in their original basicity values, said process comprising contacting said partially deteriorated anion exchange resin with a lower alkylenehalohydrin selected from the class consisting of lower alkylenechlorohydrins and lower alkylenebromohydrins.

6. A process as defined in claim 5, wherein the partially deteriorated anion exchange resin is refluxed with an ethylenehalohydrin.

7. A process as defined in claim 5, wherein the partially deteriorated anion exchange resin is first regenerated to the hydroxyl exchanging condition and subsequently contacted with an ethylenehalohydrin.

8. A process as defined in claim 5, wherein an ethylenehalohydrin is employed in the form of an aqueous solution.

9. A process as defined in claim 5, wherein the active anion exchanging group is a N-(di-lower alkyl, ethanol) quaternary ammonium hydroxide-methylene substituent.

10. A process as defined in claim 5, wherein the partially deteriorated anion exchange resin is contacted with an 8% aqueous solution of an ethylenehalohydrin.

11. A process as defined in claim 5, wherein the resin is contacted with an ethylenehalohydrin in situ in the anion exchange equipment.

12. A process as defined in claim 5, wherein the copolymer resin comprises a copolymer of styrene and divinylbenzene.

13. A process as defined in claim 12, wherein the lower alkylenehalohydrin is ethylenechlorohydrin.

14. A process as defined in claim 12, wherein the partially deteriorated anion exchange resin is first regenerated to the hydroxyl exchanging condition and subsequently contacted with ethylenechlorohydrin.

15. A process as defined in claim 12, wherein the ethylenehalohydrin is employed in an aqueous solution.

16. A process as defined in claim 12, wherein the partially deteriorated resin is restored to a higher basicity by contacting it with an aqueous solution of ethylenechlorohydrin in situ in the anion exchange equipment.

17. A process as defined in claim 5, wherein the copolymer resin comprises a copolymer of styrene and a diolefinic unsaturated aliphatic crosslinker compound.

18. A process as defined in claim 17, wherein the diolefinic unsaturated aliphatic crosslinker compound is an acrylic diester of an aliphatic polyhydric alcohol.

References Cited in the file of this patent

UNITED STATES PATENTS

| | | |
|---|---|---|
| 2,543,666 | Michael | Feb. 27, 1951 |
| 2,591,573 | McBurney | Apr. 1, 1952 |

UNITED STATES PATENT OFFICE

CERTIFICATE OF CORRECTION

Patent No. 2,702,795 February 22, 1955

Martin E. Gilwood

It is hereby certified that error appears in the printed specification of the above numbered patent requiring correction and that the said Letters Patent should read as corrected below.

Column 6, line 46, for "8% aqueous" read --80% aqueous--.

Signed and sealed this 19th day of April, 1955.

(SEAL)

Attest:
E. J. MURRY

Attesting Officer

ROBERT C. WATSON
Commissioner of Patents